(12) United States Patent
Kim et al.

(10) Patent No.: US 9,395,777 B2
(45) Date of Patent: Jul. 19, 2016

(54) SYSTEM-ON-CHIP WITH CAPABILITY FOR CONTROLLING POWER SUPPLY ACCORDING TO DATA TRANSACTION AND METHOD OF OPERATING THE SAME

(71) Applicants: Soo Yong Kim, Hwaseong-Si (KR); Ju Hwan Kim, Hwaseong-Si (KR); Jun Ho Huh, Yongin-Si (KR); Kee Moon Chun, Seongnam-Si (KR)

(72) Inventors: Soo Yong Kim, Hwaseong-Si (KR); Ju Hwan Kim, Hwaseong-Si (KR); Jun Ho Huh, Yongin-Si (KR); Kee Moon Chun, Seongnam-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 316 days.

(21) Appl. No.: 14/017,389

(22) Filed: Sep. 4, 2013

(65) Prior Publication Data

US 2014/0089697 A1   Mar. 27, 2014

(30) Foreign Application Priority Data

Sep. 27, 2012   (KR) .......................... 10-2012-0107589

(51) Int. Cl.
   *G06F 1/32*   (2006.01)
   *G06F 1/26*   (2006.01)

(52) U.S. Cl.
   CPC ................ *G06F 1/26* (2013.01); *G06F 1/3228* (2013.01); *G06F 1/3243* (2013.01); *G06F 1/3287* (2013.01); *G06F 1/3296* (2013.01); *Y02B 60/1239* (2013.01); *Y02B 60/1282* (2013.01); *Y02B 60/32* (2013.01)

(58) Field of Classification Search
   CPC .... G06F 1/3225; G06F 1/3243; G06F 1/3287
   See application file for complete search history.

(56) References Cited

U.S. PATENT DOCUMENTS

| | | |
|---|---|---|
| 6,079,022 A | 6/2000 | Young |
| 7,206,954 B2 | 4/2007 | Syed et al. |
| 7,711,966 B2 | 5/2010 | Prabhakaran et al. |
| 7,788,516 B2 | 8/2010 | Conroy et al. |
| 7,908,501 B2 | 3/2011 | Kim et al. |
| 8,055,810 B2 | 11/2011 | Shan et al. |
| 8,130,009 B2 | 3/2012 | Von Kaenel |
| 8,339,891 B2 | 12/2012 | Arntzen et al. |
| 8,402,291 B2 | 3/2013 | Fletcher |
| 2007/0240001 A1 | 10/2007 | Syed et al. |
| 2008/0155284 A1 | 6/2008 | Shimohata et al. |
| 2008/0162967 A1 | 7/2008 | Wilson et al. |
| 2008/0288799 A1* | 11/2008 | Branover .............. G06F 1/3203 713/323 |
| 2010/0241885 A1 | 9/2010 | He et al. |
| 2011/0022865 A1 | 1/2011 | Gunther et al. |
| 2011/0040994 A1 | 2/2011 | Basak et al. |
| 2011/0040995 A1 | 2/2011 | Basak et al. |
| 2011/0296214 A1 | 12/2011 | Arntzen et al. |

(Continued)

FOREIGN PATENT DOCUMENTS

| | | |
|---|---|---|
| JP | 08-006681 | 1/1996 |
| JP | 10-069325 | 3/1998 |
| JP | 2010-102477 | 5/2010 |
| JP | 2011-044025 | 3/2011 |

(Continued)

*Primary Examiner* — Albert Wang
(74) *Attorney, Agent, or Firm* — Volentine & Whitt, PLLC

(57) ABSTRACT

A system-on-chip (SoC) which includes a plurality of intellectual properties (IP cores) which communicate data with a memory device operates by monitoring whether a data transaction occurs between at least one of the IP cores and the memory device, determining an operation state of the IP core according to the result of the monitoring, and supplying the IP core with power corresponding to the operation state of the IP core.

28 Claims, 14 Drawing Sheets

(56) References Cited

U.S. PATENT DOCUMENTS

| | | |
|---|---|---|
| 2011/0314314 A1 | 12/2011 | Sengupta |
| 2012/0079235 A1 | 3/2012 | Iyer et al. |
| 2012/0084591 A1 | 4/2012 | Tupman |

FOREIGN PATENT DOCUMENTS

| | | |
|---|---|---|
| JP | 2011-123798 | 6/2011 |
| JP | 2011-170647 | 9/2011 |
| JP | 2011205329 | 10/2011 |

* cited by examiner

SYSTEM-ON-CHIP WITH CAPABILITY FOR CONTROLLING POWER SUPPLY ACCORDING TO DATA TRANSACTION AND METHOD OF OPERATING THE SAME

CROSS-REFERENCE TO RELATED APPLICATIONS

This application claims priority under 35 U.S.C. §119(a) from Korean Patent Application No. 10-2012-0107589 filed on Sep. 27, 2012, the disclosure of which is hereby incorporated by reference in its entirety.

BACKGROUND

Embodiments of the inventive concept relate to a system-on-chip (SoC), and more particularly, to a SoC with a capability for controlling the power consumption of intellectual property cores, (IP cores) therewithin, and a method of operating the same.

A SoC is semiconductor technology of integrating complicated components having different functions into a single system. It includes a processor controlling the entire system and various IP cores controlled by the processor. Here, an IP core is defined to be a reusable unit of circuitry, logic, cell, or a combination thereof, which embodies the intellectual party of one entity or group of entities, and which may be integrated in the SoC. Software code may be stored in the circuitry or the logic of an IP core.

Mobile systems with a SoC including various IP cores are usually driven by a battery, and therefore, low-power design is very important. The IP cores may be in a normal operation or idle state according to their function. The SoC supplies power to the IP cores in dynamic response to circumstances.

In order to control power consumption of each IP core, conventionally the SoC performs an operation corresponding to a state which the SoC enters according to a preset program. At this time, additional consumption of power occurs for adjustment and process for the operation. In this case, there is a limit to reducing power consumption using a processor like a central processing unit (CPU).

SUMMARY

According to some embodiments of the inventive concept, there is provided a system-on-chip (SoC) connected with a memory device. The SoC includes a plurality of intellectual property cores (IP cores), a power management circuit configured to supply power to the IP cores; and a transaction unit configured to control power supplied by the power management circuit to each of the IP cores according to a data transaction between each IP core and the memory device. The power supplied to each IP core may further be controlled to depend on characteristics of the IP core.

The transaction unit may determine that an IP core is in a normal operation mode when data transfer between the IP core and the memory device occurs, that the IP core is in a stand-by mode during a period from an end of the data transfer to power-gating of the IP core, that the IP core is in a sleep mode during a period from the power gating of the IP core to a time when power supply resumes because of occurrence of data transfer between the IP core and the memory device, and that the IP core is in a wake-up mode during a period from the start of the resumption of power supply to a time when the IP core reaches an operating power for the normal operation mode.

The transaction unit may control the operating power to be supplied to an IP core in the normal operation mode, control a stand-by power which is less than the operating power to be supplied to the IP core in the stand-by mode, interrupts power to be supplied to the IP core in the sleep mode, and control power to be gradually supplied to the IP core from no power up to the operating power in the wake-up mode.

The transaction unit may count a time period of the stand-by mode, compare the counted time period with a predetermined threshold value for the IP core, and control the power supply to the IP core to switch the IP core from the stand-by mode into the sleep mode when the counted time period is at least the threshold value.

The threshold values for two or more of the IP cores may be different than each other according to the different characteristics of the IP cores.

The threshold value for each IP core may be set to minimize latency and power consumption of that IP core.

According to other embodiments of the inventive concept, there is provided a SoC connected with a memory device. The SoC includes a plurality of IP cores, a transaction monitor configured to monitor a data transaction between each of the IP cores and the memory device, a period detector configured to determine an operation state of each IP core according to a monitoring result, a control unit configured to generate a power control signal to supply the IP core with a power corresponding to the operation state of the IP core, and a power management circuit configured to supply the power to the IP core according to the power control signal. The power supplied to each IP core may further be controlled to depend on characteristics of the IP core.

The period detector may determine that an IP core is in a normal operation mode when data transfer between the IP core and the memory device occurs, that the IP core is in a stand-by mode during a period from an end of the data transfer to power-gating of the IP core, that the IP core is in a sleep mode during a period from the power gating of the IP core to a time when power supply resumes because of occurrence of data transfer between the IP core and the memory device, and that the IP core is in a wake-up mode during a period from the start of the resumption of power supply to a time when the IP core reaches an operating power for the normal operation mode.

The control unit may generate the power control signal to supply the operating power to an IP core in the normal operation mode, to supply a stand-by power lower than the operating power to the IP core in the stand-by mode, to interrupt power to the IP core in the sleep mode, and to gradually supply power to the IP core from no power up to the operating power in the wake-up mode.

The period detector may count a time period of the stand-by mode, compare the counted time period with a predetermined threshold value, switch the IP core from the stand-by mode into the sleep mode when the counted time period is at least the threshold value, and maintain the IP core in the stand-by mode when the counted time period is less than the threshold value.

The threshold values for two or more of the IP cores may be different than each other according to the different characteristics of the IP cores.

The threshold value for each IP core may be set to minimize latency and power consumption of that IP core.

According to further embodiments of the inventive concept, there is provided a SoC including a plurality of IP cores; a memory device including a main memory, a memory controller configured to control the main memory, and a memory bus configured to interface the memory controller and the IP cores to transfer data between the main memory and the IP cores; a quality-of-service (QoS) enhancer configured to monitor a data transaction occurring in the memory bus between the IP cores and the main memory and to input and output the data in a predetermined priority order; a period detector configured to determine an operation state of each of the IP cores according to a monitoring result indicating whether the data transaction has occurred with respect to said each IP core; a control unit configured to generate a power control signal to supply each IP core with a power corresponding to the operation state of the IP core; and a power management circuit configured to supply the power to the IP core according to the power control signal.

The power management unit may be further configured to supply power to the memory device.

According to other embodiments of the inventive concept, there is provided a method of operating a SoC connected between a plurality of intellectual properties (IPs) and a memory device. The method includes monitoring whether a data transaction occurs between at least one of the IP cores and the memory device, determining an operation state of the IP core according to a monitoring result, and supplying the IP core with a power corresponding to the operation state and characteristics of the IP core.

According to still other embodiments of the inventive concept, there is provide a method of operation of a device including at least two intellectual property cores (IP cores) which may communicate with a memory device. The method includes: monitoring data transactions between each of the IP cores and the memory device; determining a state of each of the IP cores in response to the monitored data transactions; and individually controlling power supplied to each of the IP cores according to their respective states.

Determining the state of each of the IP cores may include determining, for each IP core: whether it is in an operating state, whether it is in a standby-state; whether it is in a sleep state, and whether it is in a wake-up state.

BRIEF DESCRIPTION OF THE DRAWINGS

The above and other features and advantages of the inventive concept will become more apparent by describing in detail exemplary embodiments thereof with reference to the attached drawings in which.

DETAILED DESCRIPTION OF THE EMBODIMENTS

Figure 1:
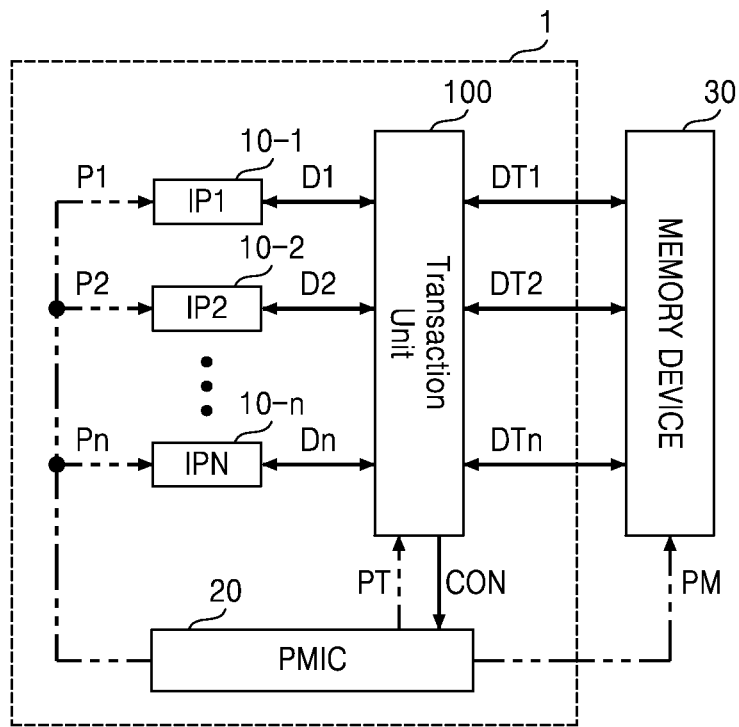
FIG. 1 is a block diagram of a system-on-chip (SoC) according to some embodiments of the inventive concept.

The inventive concept now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a system-on-chip (SoC) 1 according to some embodiments of the inventive concept.

SoC 1 includes a plurality of intellectual property cores (IP cores) 10-1 through 10-n, a transaction unit 100, and a power management unit 20. In some embodiments as described below, power management unit 20 is realized as a power management integrated circuit (PMIC) 20 which may be dedicated to performing the power management function(s) as described herein, and for consistency of explanation will be referred to hereafter as PMIC 20. SoC 1 is connected with a memory device 30 and communicates data with memory device 30 in response to at least one request of a host or the IP cores 10-1 through 10-n.

Each of the IP cores 10-1 through 10-n may be a processor controlling an entire system or an IP core 10 controlled by the processor. The IP core may be a central processing unit (CPU), one of the cores included in the CPU, a graphics processing unit (GPU), a multi-format codec (MFC), a video module (e.g., a camera interface, a Joint Photographic Experts Group (JPEG) processor, a video processor, or a mixer), an audio system, a driver, a display driver, a volatile memory device, a non-volatile memory device, a memory controller, a cache memory, a serial port, a system timer, a watch dog timer, an analog-to-digital converter, etc. Since each IP core 10 has different power consumption according to its characteristics, PMIC 20 provides different powers P1 through Pn to the respective IP cores 10-1 through 10-n according to their respective characteristics.

Transaction unit 100 is positioned between IP cores 10-1 through 10-n and memory device 30 to monitor whether any data transaction occurs between each IP core 10 and memory device 30. Transaction unit 100 controls the powers P1 through Pn supplied to the respective IP cores 10-1 through 10-n according to an operation state between each of the IP cores 10-1 through 10-n and memory device 30 and the characteristics of each IP core 10 (e.g., whether data is intermittently transferred and supply power characteristic) based on a monitoring result.

For instance, transaction unit 100 may determine that an IP core 10-k is in a normal operation state or mode when data transfer occurs between IP core 10-k and the memory device 30. In addition, transaction unit 100 may determine: that the IP core 10-k is in a stand-by state or mode during a time period from the end of the data transfer to the power-gating of IP core 10-k, that IP core 10-k is in a sleep state or mode during a time period from the power gating of IP core 10-k to a time when power supply resumes because of occurrence of data transfer, i.e., new data transaction between IP core 10-k and memory device 30, and that IP core 10-k is in a wake-up state or mode during a time period from the start of power supply due to the new data transaction to a time when an operating power for the normal operation mode is reached in IP core 10-k.

PMIC 20 is connected with the other elements 10-1 through 10-N, 100, and 30 and supplies them with power corresponding to their operation or characteristics. In detail, PMIC 20 supplies a power Pk to IP core 10-k, a power PT to transaction unit 100, and a power PM to memory device 30. In particular, PMIC 20 supplies the powers P1 through Pn to the respective IP cores 10-1 through 10-n according to the control of transaction unit 100. At this time, power supplied to each element may be controlled using a technique such as dynamic voltage frequency scaling (DVFS), clock gating, or power gating. For convenience' sake in the description, power supply control during only time periods other than the time period of the normal operation state or mode in which PMIC 20 uses DVFS will be described in the embodiments of the inventive concept below.

PMIC 20 may supply an operating power level to an IP core 10 in the normal operation state or mode according to the control of transaction unit 100, and may supply a stand-by power level which is less than the operating power to IP core 10 in the stand-by state or mode according to the control of transaction unit 100. PMIC 20 may not supply power to IP core 10 in the sleep state or mode according to the control of transaction unit 100 and may gradually supply power to IP core 10 from a state of the sleep mode until IP core 10 reaches the operating power in the wake-up state or mode according to the control of transaction unit 100.

Alternatively, transaction unit 100 may count a time period of the stand-by state or mode of IP core 10 and compare the counted time period with a predetermined threshold value. When the counted time period is greater than the threshold value, transaction unit 100 may control PMIC 20 so that IP core 10 switches from the stand-by state or mode to the sleep state or mode.

Memory device 30 is a storage device for storing data and may store an operating system (OS), various programs, and various types of data. Memory device 30 may be dynamic random access memory (DRAM), but is not restricted thereto. For instance, memory device 30 may be non-volatile memory such as flash memory, phase-change RAM (PRAM), magnetoresistive RAM (MRAM), resistive RAM (ReRAM), or ferroelectric RAM (FeRAM). In other embodiments, memory device 30 may be embedded in SoC 1. Memory device 30 may supplied with power from PMIC 20, and may transmit and receive data DTk through transaction unit 100 without intervention of a CPU.

Figure 2:
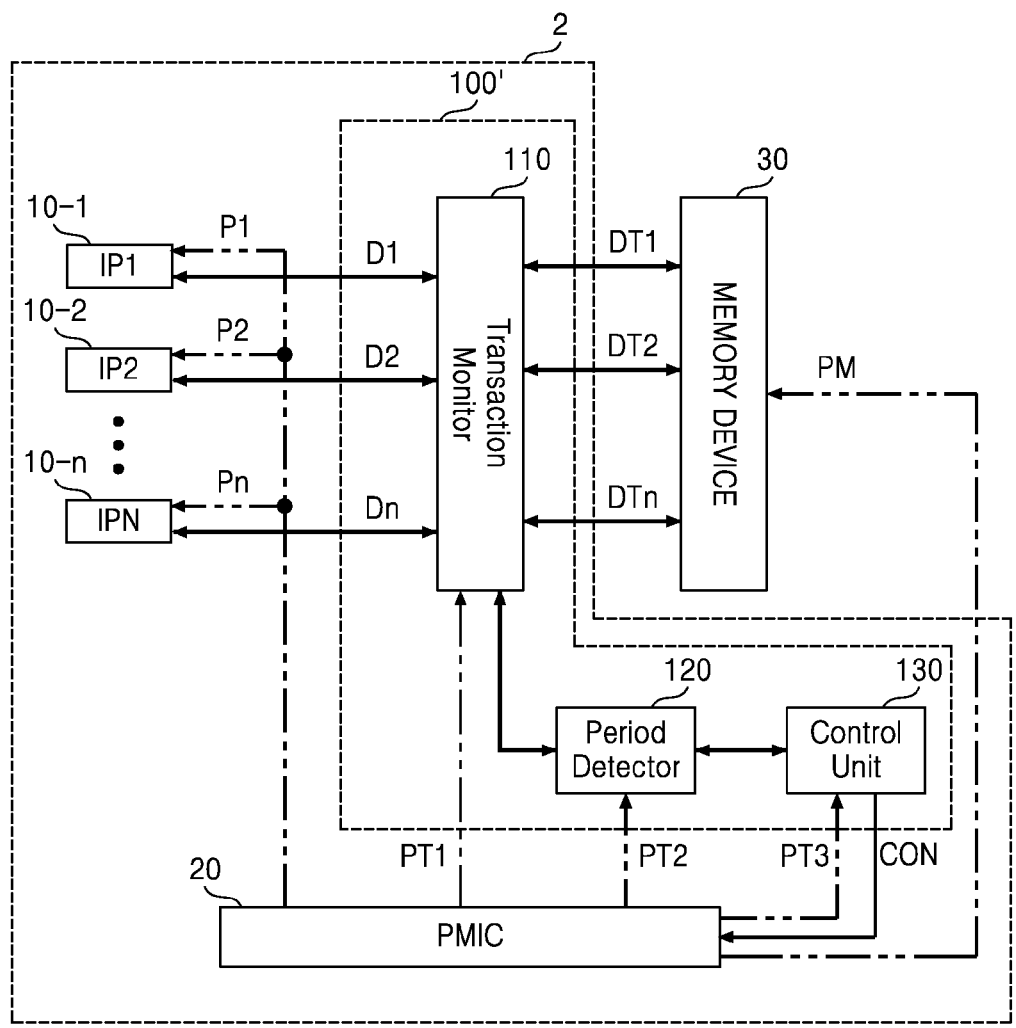
FIG. 2 is a block diagram of a SoC according to other embodiments of the inventive concept.

FIG. 2 is a block diagram of a SoC 2 according to other embodiments of the inventive concept. For convenience' sake in the description, differences from the embodiments illustrated in FIG. 1 will be mainly described.

Referring to FIG. 2, SoC 2 may include a plurality of IP cores 10-1 through 10-n, a transaction unit 100', and PMIC 20. SoC 2 may be connected with memory device 30.

Transaction unit 100' includes a transaction monitor 110, a period detector 120, and a control unit 130. Transaction monitor 110 is positioned functionally between memory device 30 and IP cores 10-1 through 10-n to monitor whether there is any data transaction between memory device 30 and IP cores 10-1 through 10-n. Transaction monitor 110 may include at least one buffer or first-in first-out (FIFO) circuit. When a data transaction occurs between one IP core 10-k and memory device 30, data from memory device 30 is temporarily stored in transaction monitor 110 and then output to IP core 10-k.

Period detector 120 may determine the operation state of each of IP cores 10-1 through 10-n based on a monitoring result. Whenever new data transfer, i.e., a new data transaction occurs, transaction monitor 110 notifies period detector 120 of the occurrence of the new data transaction. Period detector 120 may be notified only at each time when transaction monitor 110 starts to receive new data or may be notified both at each time when transaction monitor 110 starts to receive new data and at each time when transaction monitor 110 terminates the reception of the new data.

Period detector 120 may determine the operation state of each IP core based on the notification. For instance, period detector 120 may determine that IP core 10-k is in a normal operation mode when data transfer occurs between the IP core 10-k and memory device 30. In addition, period detector 120 may determine that the IP core 10-k is in a stand-by mode during a time period from the end of the data transfer to the power-gating of IP core 10-k, that IP core 10-k is in a sleep mode during a time period from the power gating of IP core 10-k to a time when power supply resumes because of occurrence of data transfer, i.e., a new data transaction between IP core 10-k and memory device 30, and that IP core 10-k is in a wake-up mode during a time period from the start of power supply due to the new data transaction to a time when an operating power for the normal operation mode is reached in IP core 10-$k$.

Alternatively, period detector 120 may count a time period of the stand-by mode of the IP core 10-$k$ and compare the counted time period ("t") with a predetermined threshold value (Th). When the counted time period is at least the threshold value (i.e., t≥Th), period detector 120 may determined that the IP core 10-$k$ is in the sleep mode. However, when the counted time period is less than the threshold value (i.e., t<Th), period detector 120 may determined that IP core 10-$k$ is in the stand-by mode. The threshold value will be described in detail with reference to FIGS. 6 through 8 later.

Control unit 130 may generate a power control signal CON so that each IP core is provided with power corresponding to the operation state determined by period detector 120 and its characteristics. For instance, control unit 130 may generate the power control signal CON for supplying an operating power to each IP core in the normal operation mode and the power control signal CON for supplying a stand-by power which is less than the operating power to the IP core in the stand-by mode. Control unit 130 may also generate the power control signal CON for interrupting power supply to the IP core in the sleep mode and the power control signal CON for gradually supplying power to the IP core from a state of the sleep mode until the IP core reaches the operating power in the wake-up mode.

PMIC 20 is connected with the other elements 10-1 through 10-N, 100', and 30 and supplies them with power corresponding to their operation state and/or characteristics. In detail, PMIC 20 supplies a power Pk to IP core 10-$k$, a power PT1 to transaction monitor 110, a power PT2 to period detector 120, a power PT3 to control unit 130, and a power PM to memory device 30. In particular, PMIC 20 supplies the powers P1 through Pn to the respective IP cores 10-1 through 10-$n$ according to the control (e.g., the power control signal CON) of control unit 130. At this time, power supplied to each element may be controlled using a technique such as DVFS, clock gating, or power gating. The power control signal CON may include power control information for all IP cores 10-1 through 10-$n$, or power control information for only some of IP cores 10-1 through 10-$n$. For convenience' sake in the description, power supply control during only time periods other than the time period of the normal operation mode in which PMIC 20 uses DVFS will be described in the embodiments of the inventive concept.

PMIC 20 may supply an operating power to each IP core in the normal operation mode according to the control of control unit 130, and may supply a stand-by power which is less than the operating power to the IP core in the stand-by mode according to the control of control unit 130. PMIC 20 may not supply power to the IP core in the sleep mode according to the control of control unit 130 and may gradually supply power to the IP core from a state of the sleep mode until the IP core reaches the operating power in the wake-up mode according to the control of control unit 130.

Figure 3:
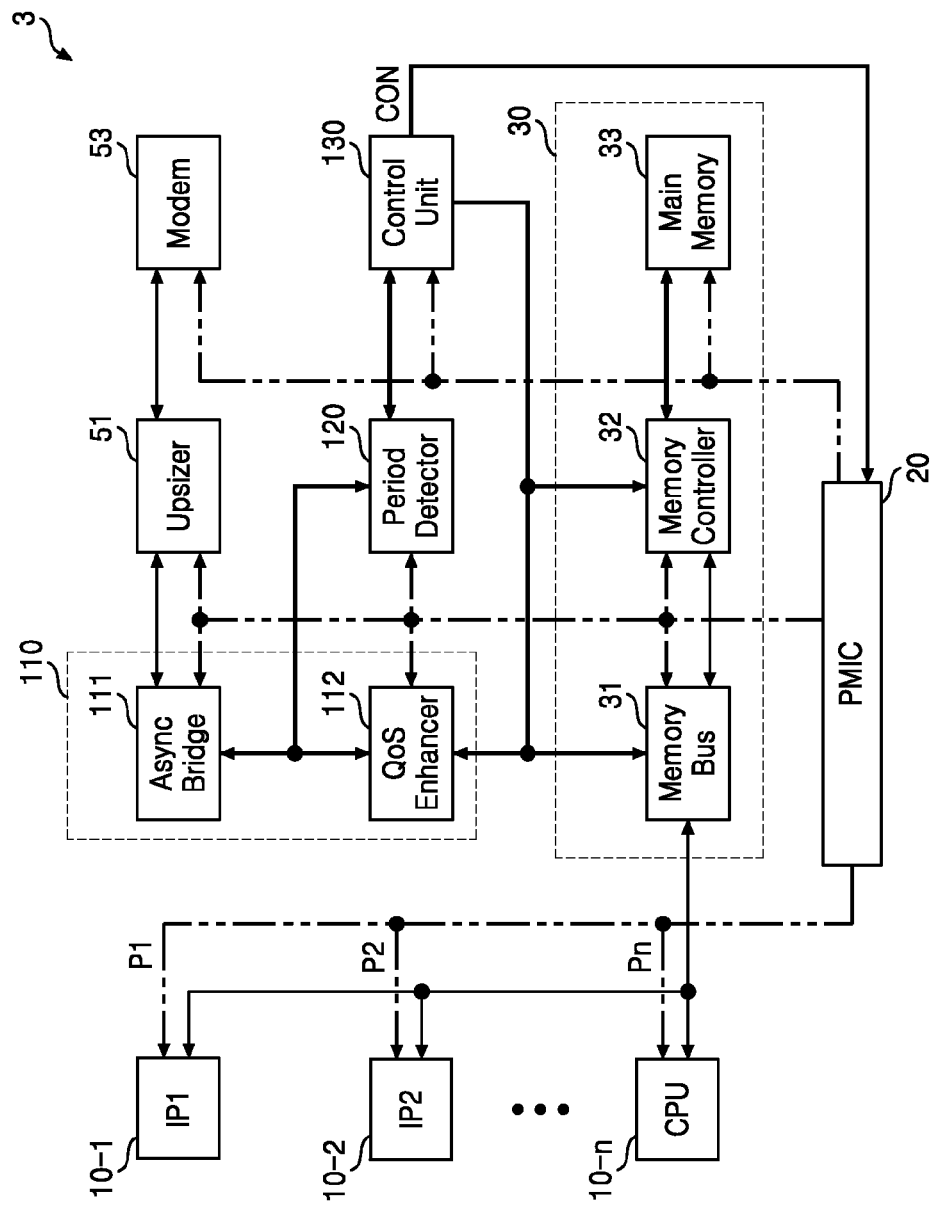
FIG. 3 is a block diagram of a SoC according to further embodiments of the inventive concept.

FIG. 3 is a block diagram of a SoC 3 according to further embodiments of the inventive concept. SoC 3 includes a plurality of IP cores 10-1 through 10-$n$, memory device 30, an upsizer 51, a modem 53, an async bridge 111, a quality-of-service (QoS) enhancer 112, period detector 120, and control unit 130.

Each of IP cores 10-1 through 10-$n$ may be a processor controlling an entire system or an IP core controlled by the processor. The IP core may be a CPU or a GPU.

Memory device 30 may include a main memory 33 storing data, a memory controller 32 controlling an access to main memory 33, and a memory bus 31 interfacing memory controller 32 and an external element (e.g., QoS enhancer 112) to transfer data from main memory 33.

Modem 53 may receive and modulate a signal from outside of SoC 3 (external to SoC 3) and may demodulate and output a signal generated in SoC 3. Upsizer 51 may adjust the size of a modulated signal or a signal to be demodulated to an output. Async bridge 111 may adjust the synchronization of the modulated signal or the signal to be demodulated with a clock signal generated in SoC 3.

QoS enhancer 112 may adjust the order of processing data according to the characteristics of the data in SoC 3 to secure the service quality of SoC 3. In detail, QoS enhancer 112 may monitor a data transaction occurring between each of IP cores 10-1 through 10-$n$ and main memory 33 through memory bus 31 and may transmit/receive data transferred through memory bus 31 to/from async bridge 111 in a predetermined priority order. QoS enhancer 112 may include a buffer which temporarily stores data transferred through memory bus 31. When there occurs a data transaction between IP core 10-$k$ and memory device 30, QoS enhancer 112 may receive and temporarily stores data from memory device 30 whenever there is new data. In other words, QoS enhancer 112 may monitor the occurrence of a data transaction based on whether new data has been temporarily stored in the buffer.

Period detector 120 may determine the operation state of each of the IP cores 10-1 through 10-$n$ according to a monitoring result. Whenever new data transfer, i.e., a new data transaction occurs, transaction monitor 110 notifies period detector 120 of the occurrence of the new data transaction. Period detector 120 may be notified only at each time when transaction monitor 110 starts to receive new data or may be notified both at each time when transaction monitor 110 starts to receive new data and at each time when transaction monitor 110 terminates the reception of the new data.

Period detector 120 may determine the operation state of each IP core based on the notification. For instance, period detector 120 may determine that IP core 10-$k$ is in a normal operation mode when data transfer occurs between IP core 10-$k$ and memory device 30. In addition, period detector 120 may determine that the IP core 10-$k$ is in a stand-by mode during a time period from the end of the data transfer to the power-gating of IP core 10-$k$, that IP core 10-$k$ is in a sleep mode during a time period from the power gating of IP core 10-$k$ to a time when power supply resumes because of occurrence of data transfer, i.e., new data transaction between IP core 10-$k$ and memory device 30, and that IP core 10-$k$ is in a wake-up mode during a time period from the start of power supply due to the new data transaction to a time when an operating power for the normal operation mode is reached in IP core 10-$k$.

Alternatively, period detector 120 may count a time of the stand-by mode of the IP core 10-$k$ and compare a counted time period ("t") with a predetermined threshold value (Th). When the counted time period is at least the threshold value (i.e., t≥Th), period detector 120 may determine that IP core 10-$k$ is in the sleep mode. However, when the counted time period is less than the threshold value (i.e., t<Th), period detector 120 may determine that IP core 10-$k$ is in the stand-by mode. The threshold value will be described in detail with reference to FIGS. 6 through 8 later.

Control unit 130 may generate a power control signal CON so that each IP core is provided with power corresponding to the operation state determined by period detector 120. For instance, control unit 130 may generate the power control signal CON for supplying an operating power to each IP core in the normal operation mode and the power control signal CON for supplying a stand-by power lower than the operating power to the IP core in the stand-by mode. Control unit 130 may also generate the power control signal CON for interrupting power supply to the IP core in the sleep mode and the power control signal CON for gradually supplying power to the IP core from a state of the sleep mode until the IP core reaches the operating power in the wake-up mode.

PMIC 20 is connected with the other elements 10-1 through 10-N, 111, 112, 51, 53, 120, 130, and 30 and supplies them with power according to their operation state or characteristics. In particular, PMIC 20 supplies the powers P1 through Pn to respective IP cores 10-1 through 10-n according to the control of control unit 130. At this time, power supplied to each element may be controlled using a technique such as DVFS, clock gating, or power gating. For the sake of convenience' in the description, power supply control during only time periods other than the time period of the normal operation mode in which PMIC 20 uses DVFS will be described in the embodiments of the inventive concept.

PMIC 20 may supply an operating power to each IP core in the normal operation mode according to the control of control unit 130 and may supply a stand-by power lower than the operating power to the IP core in the stand-by mode according to the control of control unit 130. PMIC 20 may not supply power to the IP core in the sleep mode according to the control of the control unit 130 and may gradually supply power to IP core from a state of the sleep mode until the IP core reaches the operating power in the wake-up mode according to the control of control unit 130.

Figure 4:
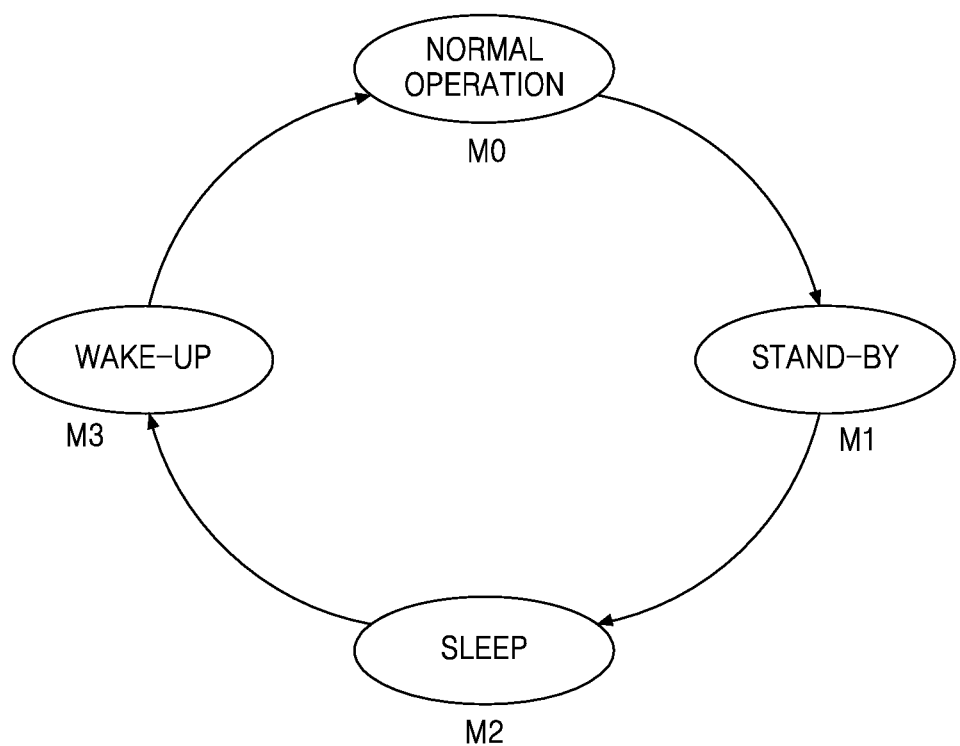
FIG. 4 is a diagram of the operation states of each of intellectual properties (IPs) illustrated in FIG. 1.
Figure 5:
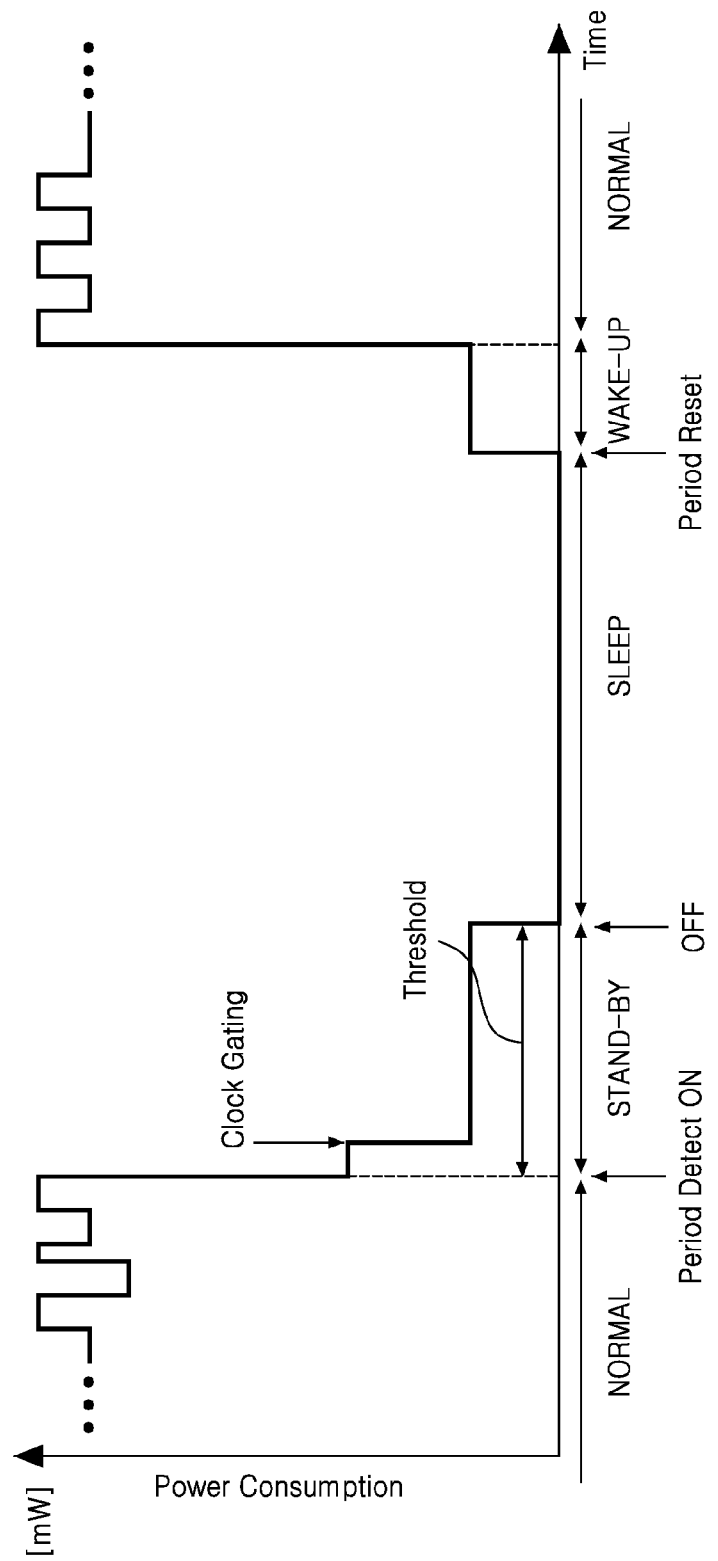
FIG. 5 is a timing chart of power consumption with respect to the states illustrated in FIG. 4.

FIG. 4 is a diagram of the operation states of each of the IP cores 10-1 through 10-n illustrated in FIG. 1. FIG. 5 is a timing chart of power consumption with respect to the states illustrated in FIG. 4.

The IP cores 10-1 through 10-n may be in one of four operation states. Referring to FIGS. 4 and 5, a normal operation state or mode M0 is a time period in which a data transaction occurs between IP core 10-k and memory device 30. In the normal operation state or mode M0, the power consumption may slightly fluctuate around a nominal operating power, depending on an operation. A stand-by state or mode M1 is a time period from a time when the data transaction ends since there is no new data communication between IP core 10-k and memory device 30 to a time when IP core 10-k is power-gated through clock-gating, that is, when IP core 10-k is powered down. Period detector 120 counts a time period (t) from the start of the stand-by mode to the power-down of IP core 10-k and compares the counted time period (t) with a threshold value to determine whether to switch IP core 10-k into a sleep mode M2.

The sleep state or mode M2 is a time period while IP core 10-k is powered down. In the sleep mode M2, power supply to IP core 10-k is interrupted.

A wake-up state or mode M3 is a middle time period from a time when IP core 10-k is powered on since new data occurs between the IP core 10-k and memory device 30, to a time when an the clock and power have recovered sufficiently for normal operation. When an operating power is abruptly supplied to IP core 10-k that has been powered down, a surge voltage may occur. To prevent the surge voltage, power may be gradually supplied from the power-down up to an operating voltage. Meanwhile, period detector 120 resets the time period (t) information of IP core 10-k, which was stored in a previous cycle. When IP core 10-k is sufficiently recovered to the operating power since the occurrence of the new data, it starts operation in the normal operation mode M0.

Figure 6:
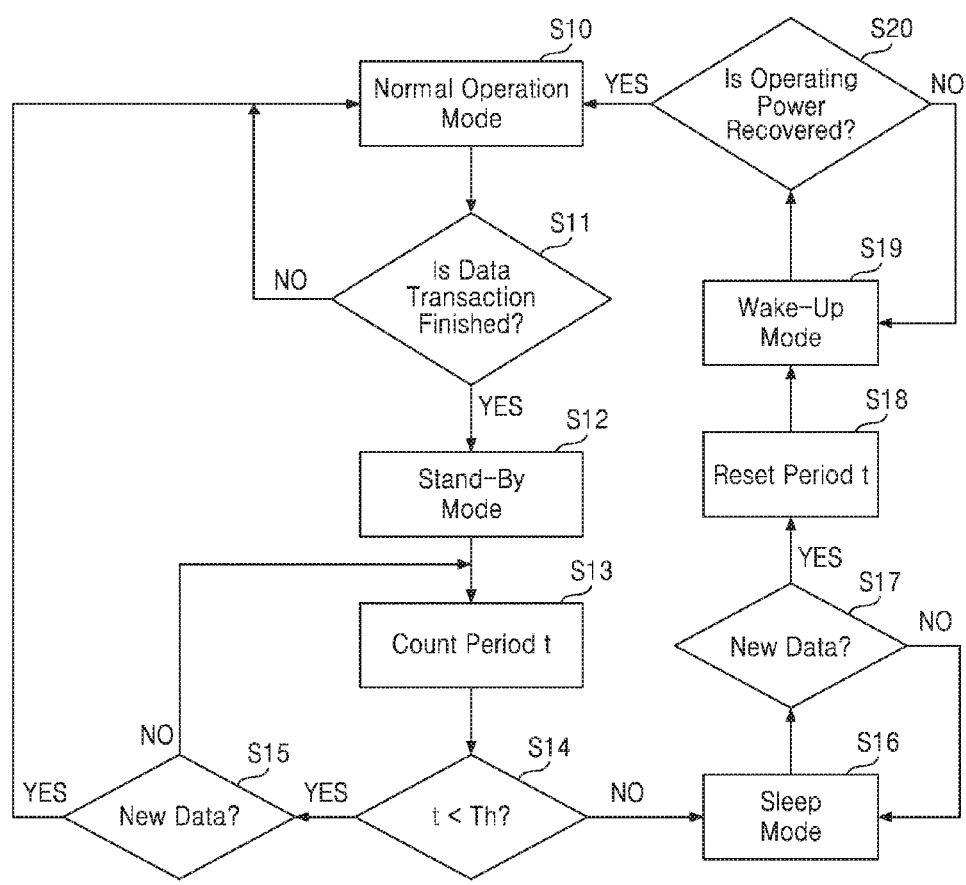
FIG. 6 is a flowchart of a power control method of a SoC according to some embodiments of the inventive concept.

FIG. 6 is a flowchart of a power control method of a SoC according to some embodiments of the inventive concept. Here, it is assumed that a threshold value Th compared with a time period "t" of the stand-by state or mode M1 is adaptively predetermined for each IP core. The threshold value Th may be set by a designer based on the characteristics of the IP core and the SoC.

Referring to FIG. 6, IP core 10-k is in the normal operation state or mode M0 in operation S10 in which it continues data communication with the memory device 30. When a data transaction finishes since the data communication does not occur during a predetermined time in operation S11, IP core 10-k enters the stand-by state or mode M1 in operation S12. The SoC counts a time period "t" starting from when the IP core 10-k enters the stand-by state or mode M2 in operation S13. When the counted time period "t" is less than the predetermined threshold value Th in operation S14 and there is no occurrence of new data in operation S15, IP core 10-k is determined to be in the stand-by state or mode M1. However, when new data occurs in the stand-by state or mode M1 in operation S15, IP core 10-k is determined to be in the normal operation state or mode M0.

When the counted time period "t" is at least the predetermined threshold value Th in operation S14, IP core 10-k is determined to switch into the sleep state or mode M2 in operation S16. IP core 10-k is powered off in the sleep state or mode M2. Thereafter, when new data occurs in operation S17, IP core 10-k is gradually supplied with power and the previous counted time period "t" is reset in operation S18. At this time, IP core 10-k is determined to be in the wake-up state or mode M3 in operation S19 until the power of IP core 10-k reaches the operating power in operation S20.

Accordingly, even when there is a plurality of IP cores, the operation state of each IP core is determined according to the occurrence of a data transaction between the IP core and a memory device, and power supply is adapted according to the operation state, so that the power consumption of the SoC is minimized. Furthermore, power supply to each IP core is controlled without intervention of another IP core such as a CPU or a digital signal processor (DSP), thereby reducing the load of the CPU or DSP as well as reducing the power consumption of the SoC.

Figure 7:
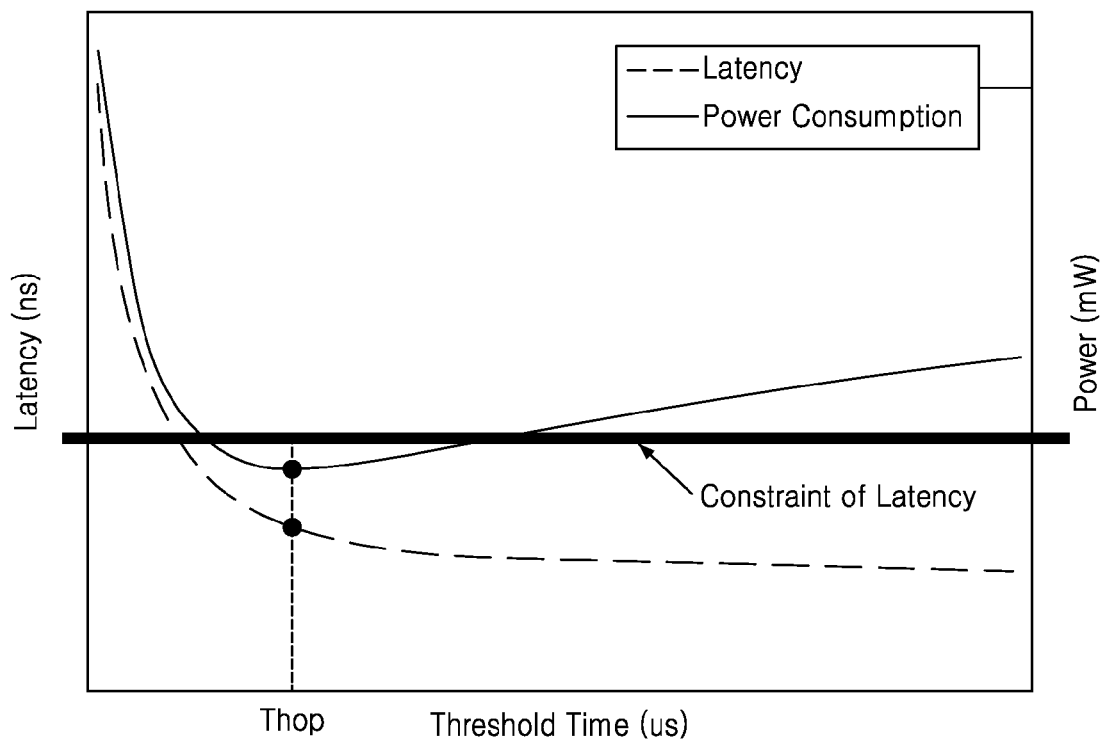
FIG. 7 is a graph showing power consumption and latency with respect to threshold time in a SOC according to some embodiments of the inventive concept.

FIG. 7 is a graph showing power consumption and latency with respect to threshold time in a SoC according to some embodiments of the inventive concept. A time period in which the SoC is in a wake-up state or mode, that is, a wake-up time period may be in a range of nanoseconds (ns) to microseconds (ms). The wake-up time period depends on a rising time of an analog power switch which is power-gated. For instance, when a threshold value is set to a small value, the wake-up time may unnecessarily increase, resulting in the increase of power consumption. When the threshold value is set to a large value, the power consumption may not be reduced. Accordingly, it is necessary to properly adjust the threshold value.

Referring to FIG. 7, the graph of power consumption is a convex-downward curve with a minimum threshold value. Since battery performance increases when the power consumption of the SoC and each IP core decreases, a threshold value giving minimum power consumption is necessary.

A minimum threshold value $Th_{OP}$ illustrated in FIG. 7 may be obtained using Equations 1 through 3:

$$x[n] = x[n-1] + \sum_{i=1}^{N} a_i u_i[n]. \tag{1}$$

Equation 1 expresses the power consumption of the SoC. In other words, a current power consumption x[n] is a power consumption x[n−1] in a previous cycle plus a current power consumption $a_i u_i[n]$ of each IP core, where "i" is an index of each IP core, N is the number of IP cores, x[ ] is a power consumption, and $a_i u_i[n]$ is a power consumption corresponding to the operation state of each IP core. Each IP core operates according to digital clock, and $a_i[n]$ means consuming power of i-th IP core in n-th cycle of digital clock. $u_i[n]$ is the control input into the i-th IP core. For example, when i-th IP core operates in the operating state, $u_i[n]$ may be 1. When i-th IP core operates in the stand-by state or mode, $u_i[n]$ may be 2. When i-th IP core operates in the sleep state or mode, $u_i[n]$ may be 3. When i-th IP core operates in the wake-up state or mode, $u_i[n]$ may be 4. However, $u_i[n]$ is not restricted thereto and may be set differently. The power consumption corresponding to the operation state, $a_i u_i[n]$, is defined as Equation 2:

$$a_i u_i[n] = \begin{cases} a_{i,m0}(NormalOperatingMode) \\ a_{i,m1}(StandbyMode) \\ a_{i,m2}(SleepMode) \\ a_{i,m3}(WakeupMode) \end{cases}, \quad (2)$$

where $a_{i,m0}$, $a_{i,m1}$, $a_{i,m2}$, and $a_{i,m3}$ are power consumptions respectively corresponding to a normal operation state or mode, a stand-by state or mode, a sleep state or mode, and a wake-up state or mode.

The SoC selects one of the four values $a_{i,m0}$, $a_{i,m1}$, $a_{i,m2}$, and $a_{i,m3}$ according to the operation state of the each IP core and controls power supplied to the IP core as shown in FIG. 7. The four values $a_{i,m0}$, $a_{i,m1}$, $a_{i,m2}$, and $a_{i,m3}$ may be different according to the characteristics of each IP core. For instance, the values $a_{i,m0}$, $a_{i,m1}$, $a_{i,m2}$, and $a_{i,m3}$ of a first IP core may be different from the values $a_{i,m0}$, $a_{i,m1}$, $a_{i,m2}$, and $a_{i,m3}$ of a second IP core.

Optimization may be performed when a cost function is maximized or minimized under specific constraint. In order to obtain the threshold value minimizing the power consumption according to Equations 1 and 2, a cost function J is defined as Equation 3:

$$\min_{T_{th}} J = x[n] = x[0] + \sum_{j=1}^{n}\sum_{i=1}^{N} \alpha_i u_i[j]. \quad (3)$$

$a_i[n]$ and $u_i[n]$ may be a function of threshold value Tth. In other words, $a_{i,m0}$, $a_{i,m2}$, and $a_{i,m3}$ may vary according to threshold value Tth. Optimization may be performed when the cost function J is minimized by selecting appropriate threshold value Tth. Meanwhile, the graph of the latency of the SoC is a curve decreasing as the threshold value increases. However, there is a constraint of latency corresponding to the characteristics of the SoC or an IP core. Accordingly, it is necessary to set the threshold value to have less latency than a constraint of latency, $T_{lim}$:

$$C_1 = \frac{1}{P}\sum_{k=1}^{P} L_k < T_{lim}, \quad (4)$$

where $C_t$ is a moving average of latency during a period of time. An IP core may request service to another IP core. For example, CPU may send command to memory for read or write. P is the number of requests in the period, and $L_k$ is a latency for the processing of the requests in each IP core. When Equation 4 is rearranged with respect to a current latency, Equation 5 is obtained:

$$L_k = \max_i\{L_i \mid T_{OP,i} + T_{WU,i}\}. \quad (5)$$

In other words, the latency $L_k$ of an IP core is the sum of a normal operation mode time period $T_{OP,i}$ and a wake-up mode time period $T_{WU,i}$. Since a maximum value of latency $L_k$ of the IP core is used as the latency of an entire system including the SoC, the latency $L_k$ is a maximum latency. The latency $L_k$ may vary according to threshold value Tth. Optimization may be performed when the cost function of Equation 3 is minimized under constraint of Equation 4. When a computer simulation is performed based on Equations 3 through 5 according to the graph illustrated in FIG. 7, the relationship between power consumption and latency with respect to threshold value can be obtained. The graph showing the relationship between power consumption and latency with respect to threshold value may be different depending on data transaction characteristics of an IP core. For instance, the latency may be expressed as a curve that decreases as the threshold value increases.

Therefore, an optimum threshold value needs to be set taking the latency $L_k$ and power consumption of the entire SoC into account. In other words, the optimum threshold value $Th_{OP}$ may be set to a value of the stand-by mode time period "t" which gives less latency than the constraint of latency, and also provides a minimum power consumption. A more detailed description about the Equations 1~5 is written in the paper, "Time-based power control architecture for application processors in smartphones", Electronics Letters, vol. 48, no. 25, December 2012.

Figure 8:
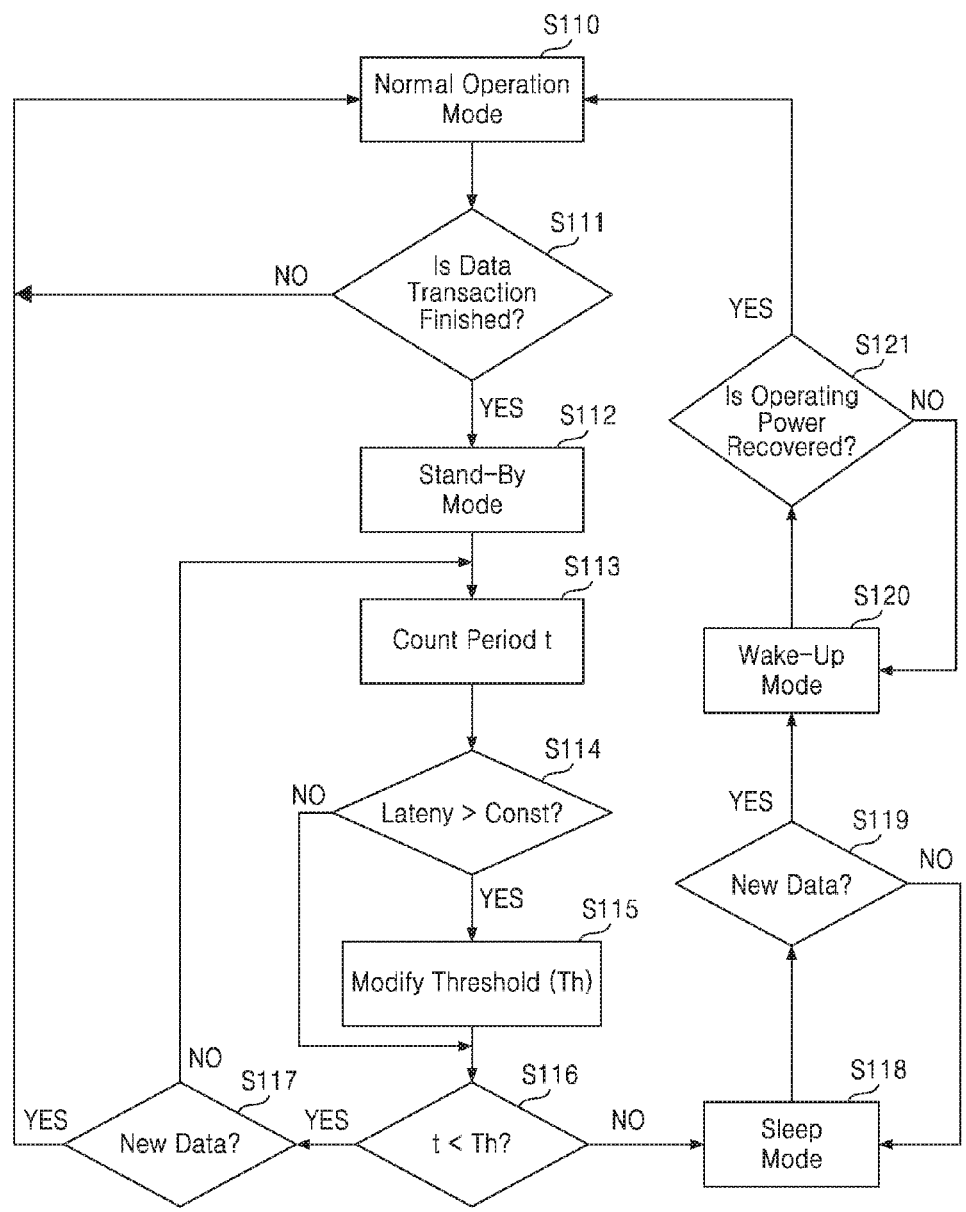
FIG. 8 is a flowchart of a power control method of a SoC according to other embodiments of the inventive concept.

FIG. 8 is a flowchart of a power control method of a SoC according to other embodiments of the inventive concept. Referring to FIG. 8, the SoC operates based on an optimum threshold value set taking the latency and power consumption of the entire SoC 100 into account.

IP core 10-k is in the normal operation mode M0 in operation S110 in which it continues data communication with memory device 30. When a data transaction finishes since the data communication does not occur during a predetermined time in operation S111, IP core 10-k enters the stand-by mode M1 in operation S112. SoC 100 counts a time period "t" starting from when IP core 10-k enters the stand-by mode M2 in operation S113. When the latency of IP core 10-k is greater than a constraint of latency "Const" in operation S114, a predetermined threshold value Th is modified in operation S115. When the latency of IP core 10-k is equal to or less than the constraint of latency "Const" in operation S114, the predetermined threshold value Th is used without modification. When the counted time period "t" is less than the threshold value Th in operation S116 and there is no occurrence of new data in operation S117, IP core 10-k is determined to be in the stand-by mode M1.

However, when new data occurs in the stand-by mode M1 in operation S117, IP core 10-k is determined to be in the normal operation mode M0.

When the counted time period "t" is at least the threshold value Th in operation S116, IP core 10-k is determined to switch into the sleep mode M2 in operation S118. IP core 10-k is powered off in the sleep mode M2. Thereafter, when new data occurs in operation S119, IP core 10-$k$ is gradually supplied with power and IP core 10-$k$ is determined to be in the wake-up mode M3 in operation S120 until the power of IP core 10-$k$ reaches the operating power in operation S121. At this time, the counted time period "t" that has been stored in a current cycle is reset.

Accordingly, even when there is a plurality of IP cores, the operation state of each IP core is determined according to the occurrence of a data transaction between the IP core and a memory device and power supply is adaptively performed according to the operation state, so that the power consumption of the SoC is minimized. Furthermore, power supply to each IP is controlled without intervention of another IP core such as a CPU or a DSP, thereby reducing the load of the CPU or DSP as well as reducing the power consumption of the SoC.

Figure 9:
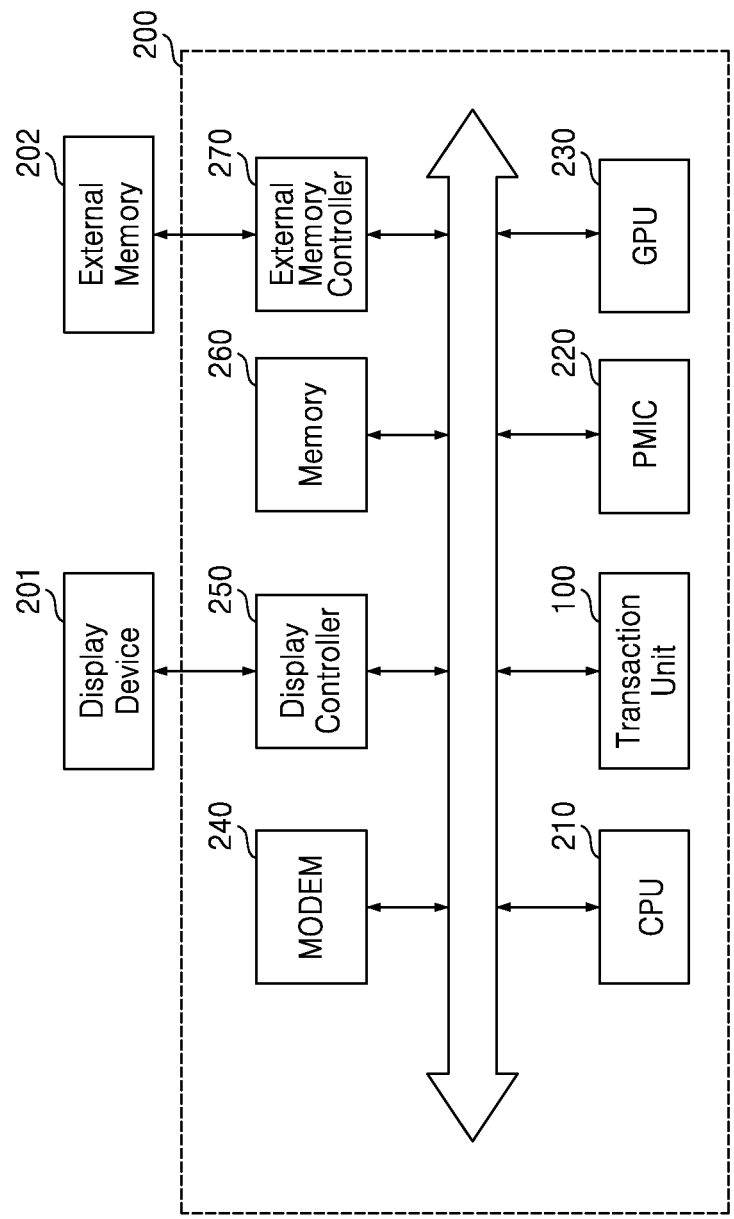
FIG. 9 is a block diagram of an electronic system including a SoC according to some embodiments of the inventive concept.

FIG. 9 is a block diagram of an electronic system 200 including a SoC according to some embodiments of the inventive concept. Electronic system 200 includes a CPU 210, a PMIC 220, a GPU 230, transaction unit 100, a modem 240, a display controller 250 interfacing with an external display device 201, a memory 260, an external memory controller 270 interfacing with an external memory 202, and a memory bus. Electronic system 200 may be a SoC.

CPU 210, which may control the overall operation of SoC 200, may control the operations of the other elements 220, 230, 100, 240, 250, 260, and 270. CPU 210 may be one of a plurality of IP cores and may not intervene when power supply to other IP cores (e.g., elements 220 230, 240, 250, 260, and 270) is controlled.

Modem 240 may receive and modulate a signal from an outside of SoC 200 and may demodulate and output a signal generated within SoC 200. A data transaction may intermittently occur through modem 240 at an external request.

External memory controller 270 may control a memory access when data is received from or transmitted to external memory 202 connected with SoC 200. Programs and/or data stored in external memory 202 may be loaded to a memory within CPU 210 or GPU 230 or memory 260 when necessary. External memory 202 is storage for storing data and may store an OS, various programs, and various types of data. External memory 202 may be volatile memory like DRAM or non-volatile memory such as flash memory, PRAM, MRAM, ReRAM, or FeRAM. In other embodiments, external memory 202 may be embedded in SoC 200.

GPU 230 may reduce the load of CPU 210 and may read and execute program commands related with graphics processing. GPU 230 may receive graphic data that has been read from external memory 202 through external memory controller 270. GPU 230 may also process graphic data and write the processed graphic data to external memory 202 through external memory controller 270.

Memory 260 may include read-only memory (ROM) that stores permanent programs and/or data and random access memory (RAM) that temporarily stores programs, data, or instructions. The ROM may be erasable programmable ROM (EPROM) or an electrically erasable programmable ROM (EEPROM). The RAM may be DRAM or static RAM (SRAM). Memory 260 may temporarily store programs and/or data stored in external memory 202 according to the control of CPU 210 or booting code stored in the ROM.

Transaction unit 100 may monitor a data transaction of each of IP cores 201, 220, 230, 240, and 250 and controls power supply to IP cores 201, 220, 230, 240, and 250 according to the operation state and characteristics of each IP core.

PMIC 220 supplies power to each IP core according to the control of transaction unit 100.

Figure 10:
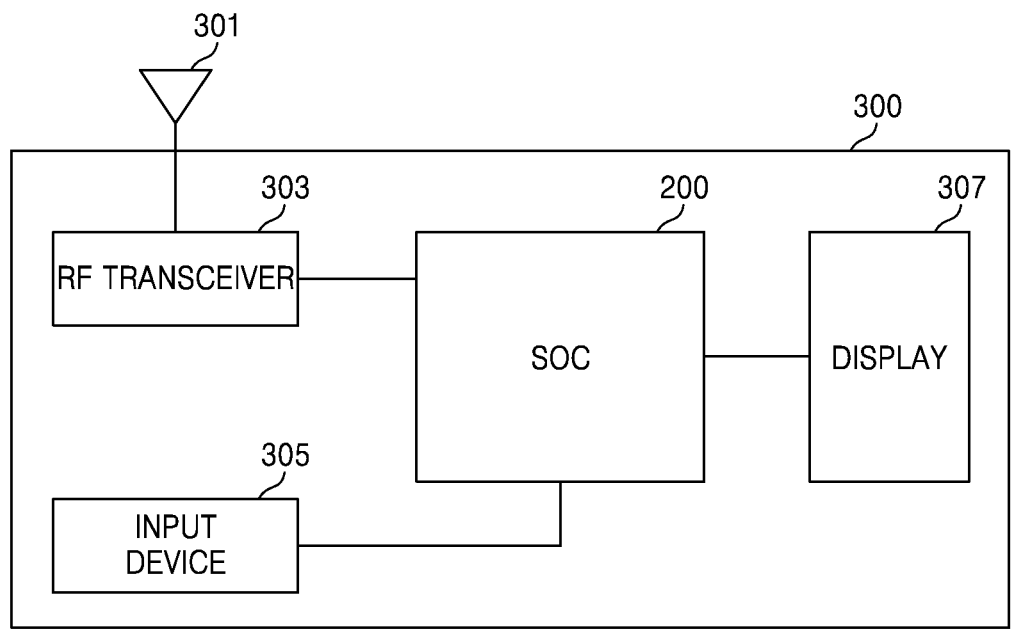
FIG. 10 is a block diagram of an electronic system including a SoC according to some embodiments of the inventive concept.

FIG. 10 is a block diagram of an electronic system 300 including a SoC according to some embodiments of the inventive concept. The electronic system 300 includes SoC 200, an antenna 301, a radio frequency (RF) transceiver 303, an input device 305, and a display 307.

RF transceiver 303 transmits or receives RF signals through antenna 301. RF transceiver 303 may convert RF signals received through antenna 301 into signals that can be processed by SoC 200. Accordingly, SoC 200 may process the signals output from RF transceiver 303 and transmit the processed signals to display 307. RF transceiver 303 may also convert signals output from SoC 200 into RF signals and output the RF signals to an external device through antenna 301.

Input device 305 enables control signals for controlling the operation of the SoC 200 or data to be processed by SoC 200 to be input to electronic system 300. Input device 305 may be implemented by a pointing device such as a touch pad or a computer mouse, a keypad, or a keyboard.

Figure 11:
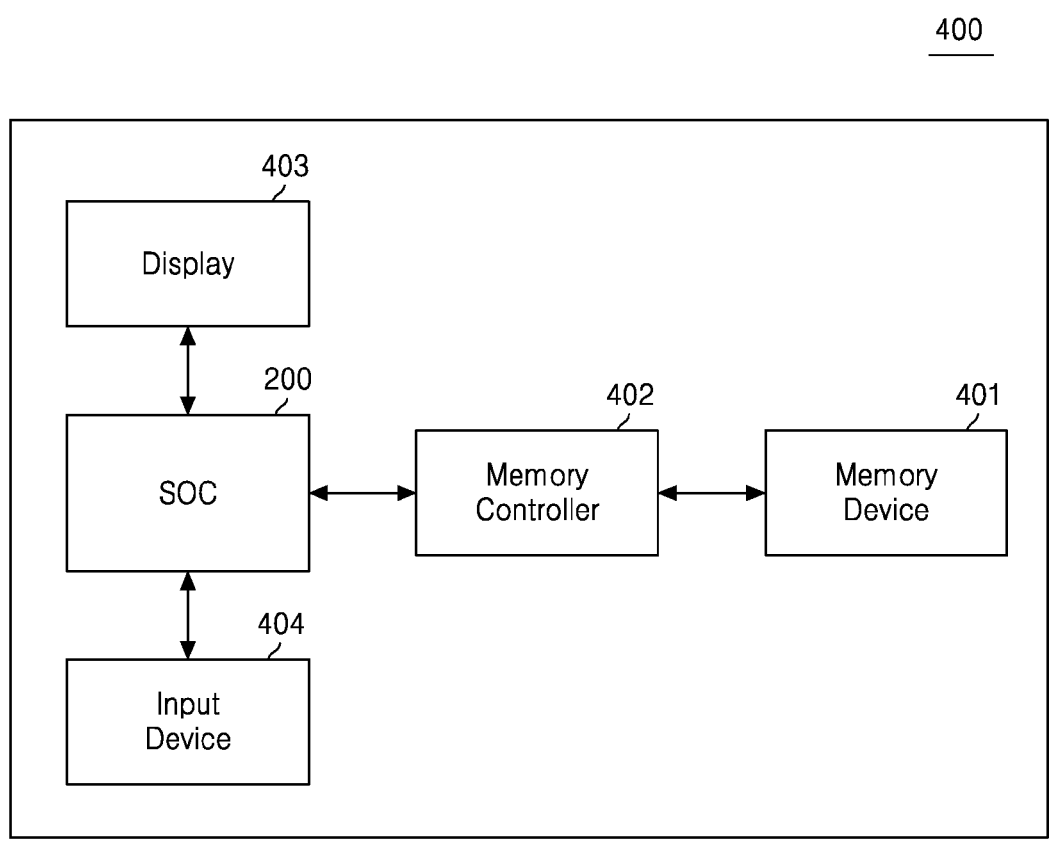
FIG. 11 is a block diagram of a computer system including a SoC according to some embodiments of the inventive concept.

FIG. 11 is a block diagram of a computer system 400 including a SoC according to some embodiments of the inventive concept. Computer system 400 may be implemented as a personal computer (PC), a network server, a tablet PC, a net-book, an e-reader, a personal digital assistant (PDA), a portable multimedia player (PMP), an MP3 player, or an MP4 player.

Computer system 400 includes a memory device 401, a memory controller 402 controlling the data processing operations of memory device 401, a display 403, and an input device 404. SoC 200 may display data stored in memory device 401 through display 403 according to data input through input device 404. Input device 404 may be implemented by a pointing device such as a touch pad or a computer mouse, a keypad, or a keyboard.

SoC 200 may control the overall operation of computer system 400 and the operations of memory controller 402. Memory controller 402, which may control the operations of memory device 401, may be implemented as a part of SoC 200 or as a separate chip.

Figure 12:
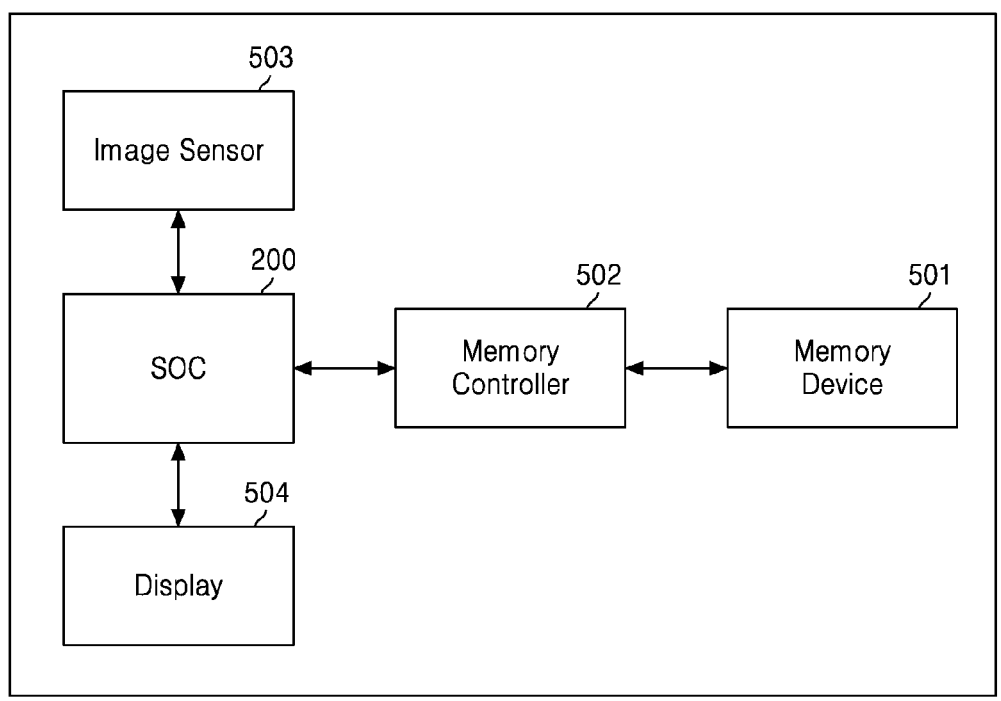
FIG. 12 is a block diagram of a computer system including a SoC according to other embodiments of the inventive concept.

FIG. 12 is a block diagram of a computer system 500 including a SoC according to other embodiments of the inventive concept. Computer system 500 may be implemented as an image processor like a digital camera, a cellular phone equipped with a digital camera, a smart phone equipped with a digital camera, or a tablet PC equipped with a digital camera.

Computer system 500 includes SoC 200, memory device 501 and a memory controller 502 controlling the data processing operations, such as a write operation, and a read operation, of memory device 501. Computer system 500 further includes an image sensor 503 and a display 504.

Image sensor 503 included in computer system 500 converts optical images into digital signals and outputs the digital signals to SoC 200 or memory controller 502. The digital signals may be controlled by SoC 200 to be displayed through a display 504 or stored in the memory device 501 through memory controller 502.

Data stored in memory device 501 may be displayed through display 504 according to the control of SoC 200 or memory controller 502. Memory controller 502, which may control the operations of memory device 501, may be implemented as a part of SoC 200 or as a separate chip.

Figure 13:
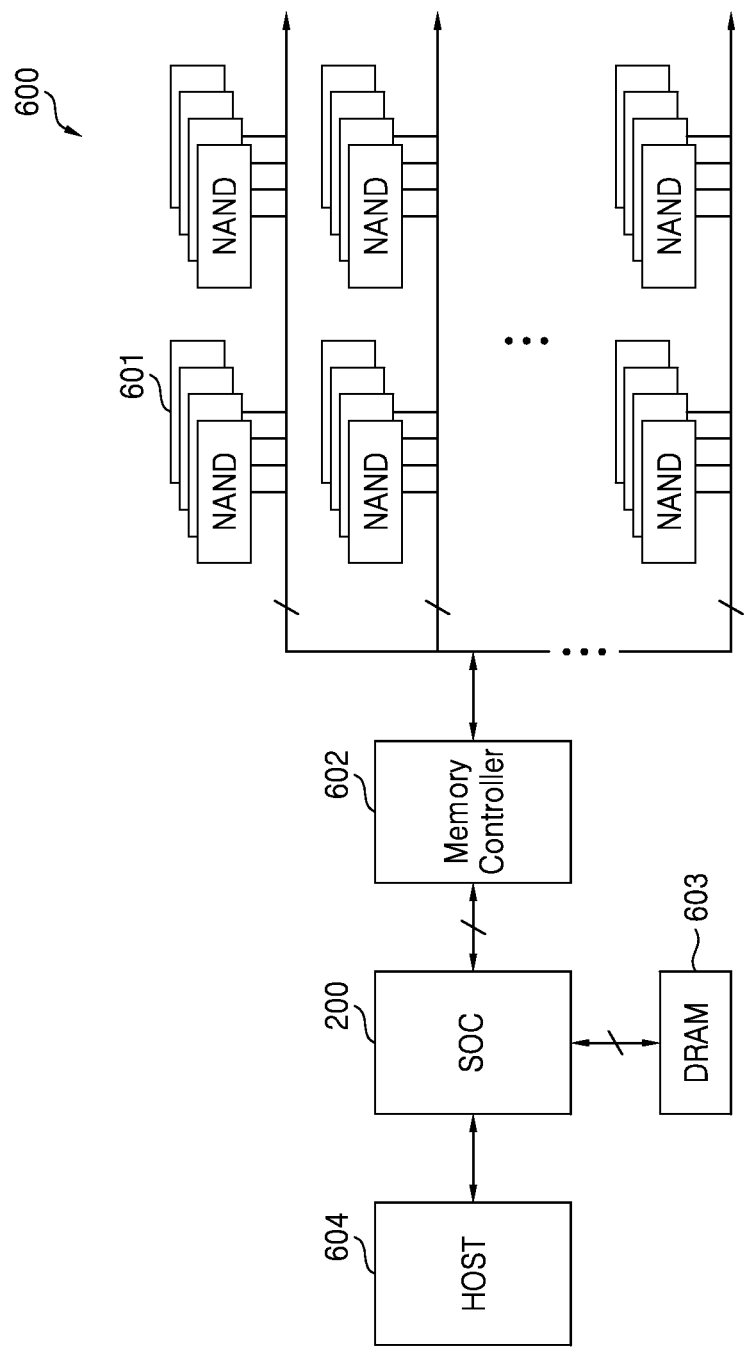
FIG. 13 is a block diagram of a memory system including a SoC according to some embodiments of the inventive concept.

FIG. 13 is a block diagram of a memory system 600 including a SoC according to some embodiments of the inventive concept. Memory system 600 may be implemented as a data storage system like a solid state drive (SSD).

Memory system 600 includes a plurality of memory devices 601, a memory controller 602 controlling the data processing operations of the memory devices 601, a volatile memory device 603 such as a dynamic random access memory (DRAM), and SoC 200 controlling data transferred between memory controller 602 and a host 604 to be stored in volatile memory device 603.

Figure 14:
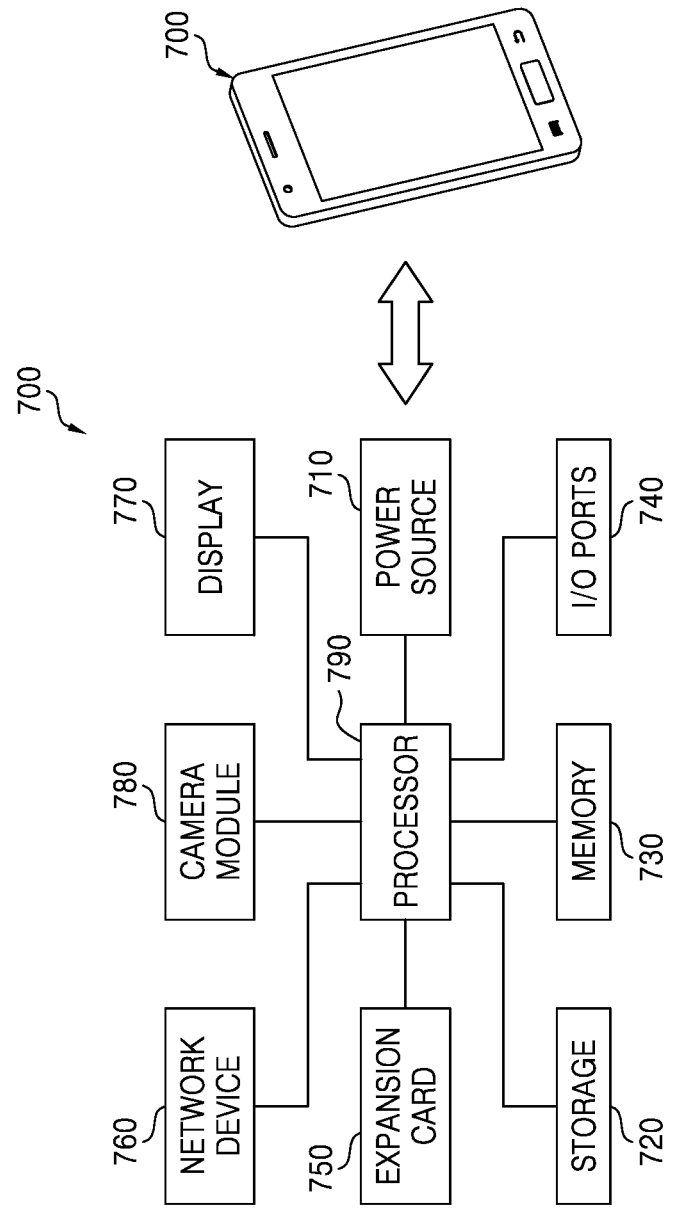
FIG. 14 is a block diagram of an electronic system including a SoC according to some embodiments of the inventive concept.

FIG. 14 is a block diagram of an electronic system 700 including a SoC according to some embodiments of the inventive concept. Referring to FIG. 14, electronic system 700 may be implemented as a portable device. The portable device may be a cellular phone, a smart phone, a tablet personal computer (PC), a personal digital assistant (PDA), an enterprise digital assistant (EDA), a digital still camera, a digital video camera, a portable multimedia player (PMP), portable navigation device (PDN), a handheld game console, or an e(electronic)-book device.

Electronic system 700 includes a processor 790, a power source 710, a storage device 720, a memory 730, I/O ports 740, an expansion card 750, a network device 760, and a display 770. Electronic system 700 may further include a camera module 780.

Processor 790 may correspond to SoC 1 illustrated in FIG. 1. Processor 790 may be a multi-core processor.

Processor 790 may control the operation of at least one of elements 710 through 790. Power source 710 may supply an operating voltage to at least one of elements 720 through 790. Storage device 720 may be implemented by a hard disk drive (HDD) or a solid state drive (SSD), for example.

Memory 730 may be implemented by a volatile or non-volatile memory. Memory 730 may correspond to memory device 30 illustrated in FIG. 1. A memory controller (not shown) that controls a data access operation, e.g., a read operation, a write operation (or a program operation), or an erase operation, of memory 730 may be integrated into or embedded in processor 790. Alternatively, the memory controller may be provided functionally between processor 790 and memory 730.

I/O ports 740 are ports that receive data transmitted to electronic system 700 and/or transmit data from electronic system 700 to an external device. For instance, I/O ports 740 may include a port connecting with a pointing device such as a computer mouse, a port connecting with a printer, and a port connecting with a USB drive.

Expansion card 750 may be implemented as a secure digital (SD) card or a multimedia card (MMC), for example. Expansion card 750 may be a subscriber identity module (SIM) card or a universal SIM (USIM) card, for example.

Network device 760 enables electronic system 700 to be connected with a wired or wireless network. Display 770 displays data output from storage device 720, memory 730, I/O ports 740, expansion card 750, and/or network device 760.

Camera module 780 may convert optical images into electrical images. Accordingly, the electrical images output from camera module 780 may be stored in storage module 720, memory 730, and/or the expansion card 750. Also, the electrical images output from camera module 780 may be displayed through display 770.

The present general inventive concept can also be embodied as computer-readable codes stored on a tangible computer-readable medium. The computer-readable recording medium may be any tangible data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the present general inventive concept can be easily construed by programmers.

As described above, according to some embodiments of the inventive concept, a SoC determines an operation state of each of a plurality of IP cores according to the occurrence of a data transaction between each IP core and a memory device and adaptively controls power supply to the IP core in accordance with the operation state, thereby minimizing power consumption. In addition, the power supply to each IP core is controlled without intervention of a processor, so that the load of the processor is reduced.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A system-on-chip (SoC) connected with a memory device, the SoC comprising:
   a plurality of intellectual property (IP cores);
   a power management circuit configured to supply power to the IP cores; and
   a transaction unit configured to control the supply of power by the power management circuit to at least one of the IP cores in response to a determination of;
   at least one IP core is in a normal operation state when a data transfer occurs between the at least one IP core and the memory device,
   the at least one IP core is in a stand-by state during a time period extending from an end of a data transfer between the at least one IP core and the memory device to a power-gating of the at least one IP core,
   the at least one IP core is in a sleep state during a period extending from a power gating of the at least one IP core to a resumption of a supply of power due to a data transfer occurring between the at least one IP core and the memory device, and
   the at least one IP core is in a wake-up state during a period extending from a resumption of the power supply to a time when the particular IP core reaches an operating power associated with the normal operation state.

2. The SoC of claim 1, wherein the transaction unit is further configured to control the operating power to supplied to the at least one IP core in the normal operation state, and to control a stand-by power which is less than the operating power supplied to the at least one IP core in the stand-by state, and
   the transaction unit is still further configured to interrupt power being supplied to the at least one IP core in the sleep state, and to gradually supply power to the at least one IP core in the wake-up state.

3. The SoC of claim 1, wherein the transaction unit is further configured to count a time period associated with the stand-by state to generate a counted time period, compare the counted time period with a threshold value for the at east one IP core, and control the power supplied to the at least one IP core to switch the at least one IP core from the stand-by state to the sleep state when the counted time period is at least equal to the threshold value.

4. The SoC of claim 3, wherein the threshold value is selected from a number of different threshold values respectively associated with at least two of the IP cores.

5. The SoC of claim 3, wherein the threshold value is set to minimize latency and power consumption of the particular IP core.

6. A system-on-chip (SoC) connected with a memory device, the SoC comprising:
 a plurality of intellectual property cores (IP cores);
 a transaction monitor configured to monitor at least one data transaction between at least one IP core and the memory device to generate a monitoring result;
 a period detector configured to determine an operation state for the at least one IP core in response to the monitoring result;
 a control unit configured to generate a power control signal that controls the supply of power to the at least one IP core corresponding to the operation state of the at least one IP core; and
 a power management circuit configured to supply power to the at least one IP core in response to the power control signal,
 wherein the period detector is further configured to determine at least one of;
 an IP core in a normal operation state when a data transfer occurs between the IP core and the memory device,
 an IP core in a stand-by state during a period extending from an end of a data transfer from the IP core to the memory device to a power-gating of the IP core,
 an IP core in a sleep state during a period extending from a power gating of the IP core to a resumption of power due to a data transfer occurring between the IP core and the memory device, and
 an IP core in a wake-up state during a period extending from a resumption of the power to the IP core to a time when the IP core reaches an operating power level associated with the normal operation state.

7. The SoC of claim 6, wherein the control unit is further configured to;
 generate the power control signal to supply the operating power to the IP core in the normal operation state,
 supply a stand-by power lower than the operating power to the IP core in the stand-by state,
 interrupt power to the IP core in the sleep state, and
 gradually supply power to the IP core in the wake-up mode-state.

8. The SoC of claim 6, wherein the period detector is further configured to;
 count a time period associated with the stand-by state to generate a counted time period,
 compare the counted time period with a threshold value,
 switch the IP core from the stand-by state to the sleep state when the counted period is at least equal to the threshold value, and
 maintain the IP core in the stand-by state so long as the counted period is less than the threshold value.

9. The SoC of claim 8, wherein the threshold value is selected from a number of different threshold values respectively associated with at least two of the IP cores.

10. The SoC of claim 8, wherein the threshold value is set to minimize latency and power consumption of the IP core.

11. A system-on-chip (SoC), comprising:
 a plurality of intellectual property cores (IP cores);
 a memory device comprising a main memory, a memory controller configured to control the main memory, and a memory bus configured to interface the memory controller and the IP cores to transfer data between the main memory and the IP cores;
 a quality-of-service (QoS) enhancer configured to monitor at least one data transaction occurring via the memory bus between at least one of the IP cores and the main memory, and to control the input of data to and output of data from the main memory according to a priority order;
 a period detector configured to determine an operation state for at least one of the IP cores according to a monitoring result indicating whether a data transaction has occurred between the main memory and the at least one of the IP cores;
 a control unit configured to generate a power control signal controlling a supply of at least one power to the at least one of the IP cores corresponding to the operation state of the at least one of the IP cores; and
 a power management circuit configured to supply the at least one power to the at least one of the IP cores in response to the power control signal.

12. The SoC of claim 11, wherein the QoS enhancer comprises a buffer configured to temporarily store data transferred via the memory bus.

13. The SoC of claim 12, wherein the period detector is further configured to determine at least one of;
 at least one IP core in a normal operation state when a data transfer occurs via the buffer,
 at least one IP core in a stand-by state during a period from an end of the data transfer via the buffer to a power-gating of the at least one IP core,
 at least one IP core in a sleep state during a period extending from a power gating of the at least one IP core to a resumption of power supply due to a data transfer between the at least one IP core and the main memory, and
 at least one IP core in a wake-up state during a period extending from resumption of power supply to a time when the at least one IP core reaches an operating power level associated with the normal operation state.

14. The SoC of claim 13, wherein the period detector is still further configured to count a time period associated with the stand-by state,
 compare the counted time period with a threshold value for the at least one IP core,
 switch the at least one IP core from the stand-by state to the sleep state when the counted time period is at least equal to the threshold value, and
 maintain the at least one IP core in the stand-by state so long as the counted period is less than the threshold value.

15. The SoC of claim 14, wherein the threshold value is set to minimize latency and power consumption of the at least one IP core.

16. The SoC of claim 13, wherein the control unit is further configured to:
 generate the power control signal controlling a supply of the operating power to the at least one IP core in the normal operation state,
 supply a stand-by power less than the operating power to the at least one IP core in the stand-by state,
 interrupt a supply of power to the at least one IP core in the sleep state, and
 gradually supply power to the at least one IP core in the wake-up state.

17. The SoC of claim 11, wherein the power management circuit is further configured to supply power to the memory device.

18. A method of operating a system-on-chip (SoC) including a plurality of intellectual property cores (IP cores) connected to a memory device, the method comprising:
monitoring whether a data transaction occurs between an IP core among the IP cores and the memory device and generating a monitoring result;
determining an operation state for the IP core in response to the monitoring result; and
supplying the IP core with power corresponding to the operation state of the IP core,
wherein the determining of the operation state for the IP core comprises at least one of;
determining that the IP core is in a normal operation mode when a data transfer occurs between the IP core and the memory device,
determining that the IP core is in a stand-by mode during a period extending from an end of the data transfer to a power-gating of the IP core,
determining that the IP core is in a sleep mode during a period extending from a power gating of the IP core to a time when power supply resumes due to another data transfer occurring between the IP core and the memory device, and
determining that the IP core is in a wake-up mode during a period extending from a resumption of the power supply to a time when the IP core reaches an operating power associated with the normal operation mode.

19. The method of claim 18, wherein the determining that the IP core is in the sleep mode comprises:
counting a time period of the stand-by mode;
comparing the counted time period with a threshold value;
determining that the IP core is in the sleep mode when the counted time period is at least equal to the threshold value.

20. The method of claim 19, wherein the threshold value is selected from a number of different threshold values respectively associated with at least two of the IP cores.

21. The method of claim 19, wherein the threshold value is set to minimize latency and power consumption of the IP core.

22. The method of claim 19, wherein the determining that the IP core is in the stand-by mode comprises determining that the counted time period is less than the threshold value.

23. The method of claim 18, wherein the supplying of the IP core with the power comprises at least one of:
supplying the operating power to the IP core in the normal operation mode;
supplying a stand-by power less than the operating power to the IP core in the stand-by mode;
interrupting a supply of power to the IP core in the sleep mode; and
gradually supplying power to the IP core in the wake-up mode.

24. A method of operation for a semiconductor device including at least two intellectual property cores (IP cores), wherein each one of the IP cores is respectively configured to engage in a data transfer with a memory device, the method comprising:
monitoring data transactions between the IP cores and the memory device to generate a monitoring result;
determining an operation state for each one of the IP cores in response to the monitoring result; and
individually controlling power supplied to each one of the IP cores according to their respectively determined operation states,
wherein the determining of the operation state for each one of the IP cores comprises at least one of;
determining that an IP core is in a normal operation state when a data transfer occurs between the IP core and the memory device,
determining that an IP core is in a stand-by state during a period extending from an end of a data transfer between the IP core and the memory device to a time when power-gating of the IP core occurs,
determining that an IP core is in a sleep state during a period extending from a power gating of the IP core to a time when a power supply resumes due to another data transfer occurring between the IP core and the memory device, and
determining that an IP core is in a wake-up state during a period extending from a resumption of a power supply to a time when the IP core reaches an operating power associated with the normal operation mode.

25. The method of claim 24, wherein determining of the operation state comprises determining an operation state for each one of the IP cores by determining whether each one of the IP cores is in the standby-state the sleep state, or the wake-up state.

26. The method of claim 25, wherein the determining of the operation state for each one of the IP cores comprises determining that an IP core is in the normal operation state when a data transaction is performed between the IP core and the memory device.

27. The method of claim 25, wherein the determining of the operation state for each of the IP cores comprises determining that an IP core is in the standby state when a data transaction is not being performed between that IP core and the memory device following elapse of a time period less than a threshold and beginning with an end of an immediately preceding data transaction between that IP core and the memory device.

28. The method of claim 27, wherein the determining of the operation state for each of the IP cores comprises determining that an IP core is in the sleep state when a data transaction is not being performed between the IP core and the memory device during a time period greater than the threshold and beginning with an end of an immediately preceding data transaction between the IP core and the memory device.

* * * * *